US005878474A

United States Patent [19]

Yasnogorodskiy et al.

[11] Patent Number: 5,878,474

[45] Date of Patent: Mar. 9, 1999

[54] METHOD FOR INSTALLING FLEXIBLE SIGN PANELS WITH MOVABLE TROLLEY

[75] Inventors: Vladimir Yasnogorodskiy, Oak Park; David U. Hillstrom, Novi; W. Douglas Schellig, Bloomfield Hills, all of Mich.

[73] Assignee: Marketing Displays, Inc., Farmington Hills, Mich.

[21] Appl. No.: 746,463

[22] Filed: Nov. 11, 1996

Related U.S. Application Data

[60] Division of Ser. No. 565,899, Dec. 1, 1995, Pat. No. 5,725,173, which is a continuation-in-part of Ser. No. 251,592, May 31, 1994, Pat. No. 5,685,054.

[51] Int. Cl.[6] ...... B23P 11/02

[52] U.S. Cl. ...... 29/431; 29/448; 242/557

[58] Field of Search ...... 29/429, 431, 281.6, 29/446, 448; 242/557

[56] References Cited

U.S. PATENT DOCUMENTS

| | | | |
|---|---|---|---|
| 1,054,313 | 2/1913 | Richardson . | |
| 3,559,914 | 2/1971 | Alderman . | |
| 5,072,496 | 12/1991 | Radermacher | 29/448 X |
| 5,163,634 | 11/1992 | Moon et al. . | |
| 5,381,324 | 1/1995 | Hillstrom et al. . | |
| 5,491,952 | 2/1996 | Alderman et al. . | |

*Primary Examiner*—Joseph M. Gorski

[57] ABSTRACT

An apparatus and method for stretching and installing a flexible face sign panel is disclosed. A frame-like trolley structure is provided which is positioned on a frame structure, preferably on a service station canopy fascia. A roll of sign panel material is positioned on a spindle which is held in place on the trolley frame structure by collar members. A roller member is provided to assist in applying the material onto the face of the frame structure. One of the collar members can be adapted to firmly hold the spindle from rotating under certain conditions. A handle member is provided to allow rotation of the spindle and thus tightening and stretching of the flexible face sign panel. Releasable securing members are provided on the frame structure to secure the trolley in position as desired along the frame structure while a portion of the sign panel is being stretched and installed. Mechanisms are provided to affix the handle member to the roll of sign panel material and to prevent the handle from rotating when desired.

7 Claims, 13 Drawing Sheets

METHOD FOR INSTALLING FLEXIBLE SIGN PANELS WITH MOVABLE TROLLEY

CROSS REFERENCE TO RELATED APPLICATIONS

This is a div of Ser. No. 08/565,899, filed Dec. 1, 1995, now U.S. Pat. No. 5,725,173, which is a continuation-in-part of U.S. patent application Ser. No. 08/251,592, filed on May 31, 1994, now U.S. Pat. No. 5,685,054.

TECHNICAL FIELD

The present invention relates to a system for installing flexible sign panels and more particularly to a method and apparatus for installing flexible face sign panels on an illuminated canopy or fascia of a business establishment.

BACKGROUND OF THE INVENTION

Businesses with outdoor service areas, such as gasoline service stations, are improving the facilities and areas around them. These companies want to keep their places of business attractive to their customers, keep the appearances comparable to other businesses, and also make the facilities better illuminated and safer in non-daylight hours.

Service stations in particular today are improving the areas around the gasoline pumping areas by installing canopies over them that are well illuminated and provide an attractive appearance. A number of these canopies have signs, lights, or illuminated faces along the fascias.

An improved system for illuminating canopy fascias of this type is disclosed, for example, in commonly-owned U.S. Pat. No. 5,381,324 entitled "Illuminated Canopy System." In that system, a decorative flexible sheet member is stretched across the face of each of the canopy fascias and held in place on an elongated frame structure. A plurality of lights, such as metal halide lights, are provided inside the fascias to distribute light on the face of the sign panel. Preferably, a light dispersion film is placed over the light sources in order to uniformly distribute the light. Also, trim caps and other housing members are provided to complete the external structure of the fascia "lightbox" device.

Other illuminated canopy systems feature use of fluorescent lamps to light the sign panels. The present invention can be used with these systems as well. In addition, the present invention can be used with non-illuminated fascia or sign systems, since it relates generally to the stretching and securing of flexible panels.

Installing the flexible sheet member on the face of the lightbox or other fascia structure can be a time consuming and difficult procedure. The canopy fascias are typically positioned approximately 15–25 feet above the ground, making them difficult to access. In addition, the flexible face sheets or panel members often are 20, 40 or even 100 or more feet in length and need to be applied as a single sheet for structural and aesthetic purposes. The sheet members also need to be installed under tension in all directions. Moreover, the flexible face sign panels are typically decorated with delicate materials which require special handling so that they will not be bent or creased which might affect the aesthetics or integrity of the final product.

Known methods for installing flexible face sign panels have included simple manual handling and stretching, applying the sign panels to the frame in the factory before it is sent to the site, as well as the use of a freely movable dolly. With the latter system, the flexible sign panel is rolled up from each end like a scroll. The installation of the sign panel proceeds from the center of the canopy fascia outwardly toward each end. Although the latter procedure works satisfactorily, it still is labor intensive, requires manual stretching and tensioning of the sign panel, and requires significant skill in aligning the pattern on the sign panel with the canopy fascia.

It is an object of the present invention to provide an improved method and apparatus for installing a flexible face sign panel on a canopy fascia structure. It is another object of the present invention to provide a system for stretching and tensioning the flexible face sign panel on a canopy fascia as it is being installed.

It is also an object of the present invention to provide an improved trolley and frame system for installing a flexible face sign panel, the trolley having improved ease of movement, improved installation and removal of rolls of the sheet material, and improved installation of the sheet material on the canopy fascia. It is a still further object of the present invention to provide an improved system for stretching and tensioning flexible face sign panels during installation which is more efficient, less costly and simpler and easier to use than known methods.

These and other objects, features, and advantages of the invention will become apparent from the following description of the invention and appended claims, when viewed in accordance with the attached drawings.

SUMMARY OF THE INVENTION

The present invention provides an improved apparatus and method for installing a flexible face sign panel on a canopy fascia structure. Once the frame structure for the lightbox housing is installed on the canopy fascia, together with the illumination system, a trolley structure is positioned on the frame structure and a roll of flexible face sign material is positioned on the trolley.

The trolley preferably comprises a frame structure with a plurality of wheels or other roller-type or glide-type members which allow the trolley to travel along the frame structure, together with a plurality of securing members, such as clamping members, stop arm members, or screw lock members to hold the trolley securely in place where desired. A pair of collar members are provided on the trolley for holding the ends of the spindle on which the flexible face sign panel is rolled. Also, a roller member is secured at one side or the other of the trolley to position and guide the flexible face sign panel onto the frame structure.

The collar members are preferably provided with two sections hingedly mounted together for ease of installation and removal of the spindle. One of the collar members also is adapted to frictionally lock the spindle from rotation when desired. That collar member also can have a restriction member for preventing complete opening of the collar member when the friction locking feature is released.

A handle member is provided which also is adapted to lock on one end of the spindle. The handle is used to manually rotate the spindle and thus the flexible face sign panel in order to stretch and tension it on the canopy fascia frame structure. Locking mechanisms are provided to hold the handle member in place while the sign panel is stretched and the edges of the sign panel are secured in place.

The trolley and roller member are adapted such that the roller member can be positioned on either side of the trolley and allow unrolling of the flexible face sign panel in either direction. This allows use of the trolley to install a sign panel starting from either end of the canopy frame structure.

For installation of the flexible face sign panel, the trolley is positioned on the frame structure after the frame structure is installed on the canopy fascia. Before positioning the trolley on the frame structure, a roll of flexible face sign panel material is positioned in the two collars on the trolley and secured in position. The end of the roll of sign material is secured to an end of the canopy fascia frame structure. Thereafter, the trolley is moved an appropriate distance along the frame structure unrolling the sign material behind it.

At this point, the trolley is clamped in position on the frame structure by the plurality of securing, clamping or locking members, or, alternatively, positively held in place by stop arm or stop block members. The handle is then used to stretch and tension the sign panel along the face of the canopy frame structure. Rotation of the spindle is locked in position by a locking mechanism associated with the collar member. At this point the upper and lower edges of the sign panel are tensioned and secured in position from the starting end of the frame structure to a position adjacent the roller member.

Once the above sequence of steps is completed, the securing members or stop members on the trolley are released, the trolley is moved along the frame structure to another location, and the process is repeated for stretching and securing another section of the sign panel to the frame structure. The same process and procedure is repeated along the length of the canopy fascia until the trolley reaches the opposite end. At this point, the remainder of the sign material is removed from the spindle and the trolley is removed from the frame structure. The final portion of the sign material is then stretched and positioned on the frame structure by hand, thereby completing the installation.

BEST MODE(S) FOR CARRYING OUT THE INVENTION

FIGS. 1–11 illustrate the features and advantages of one embodiment of the present invention. The present invention is particularly suitable for use in installing flexible face sign panels on canopy fascias at gasoline service stations. However, it is understood that the present invention can be used to install sheet members on any structure where desired.

Figure 1:
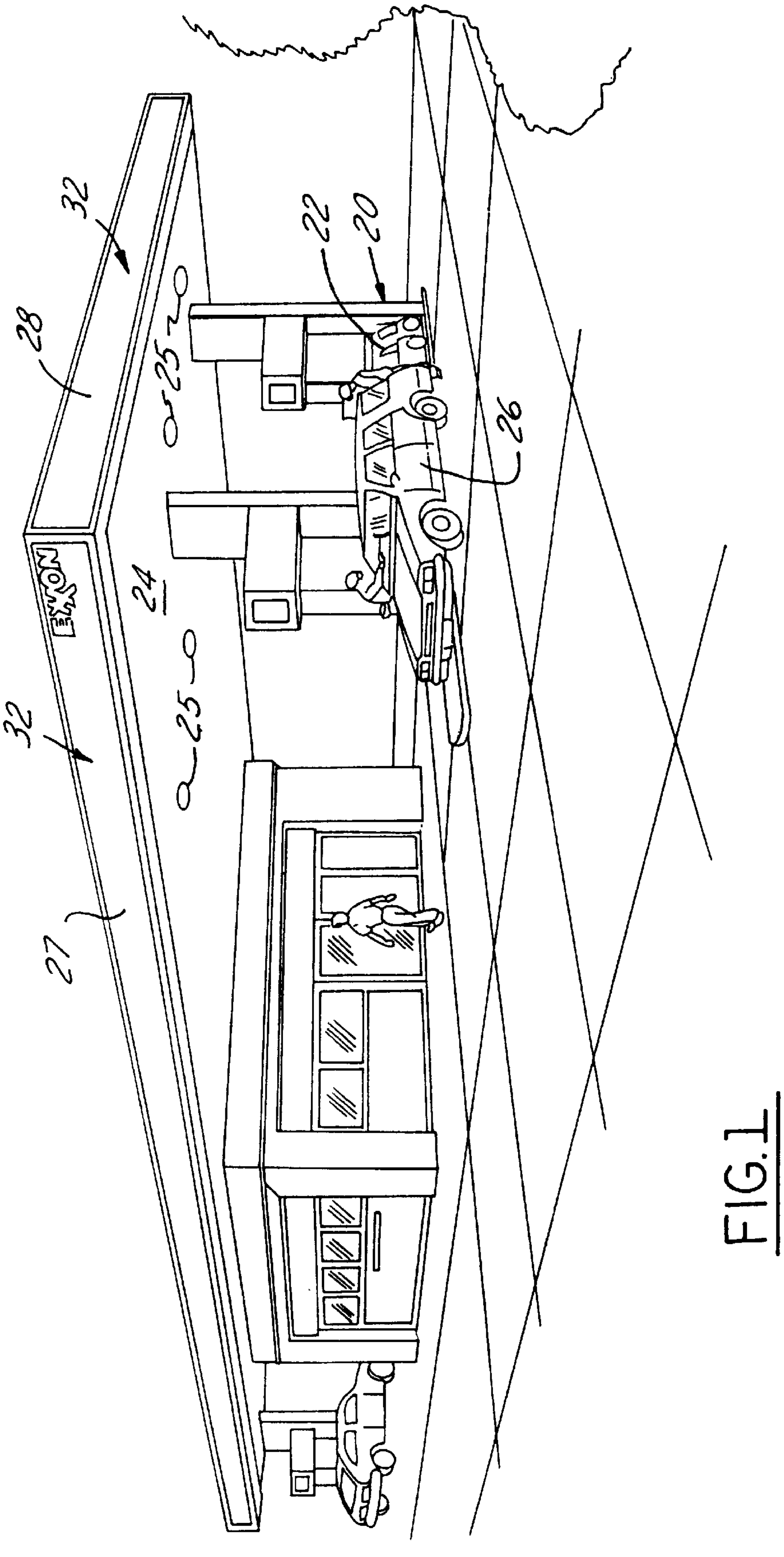
FIG. 1 illustrates an illuminated canopy and fascia system for a service station.
Figure 2:
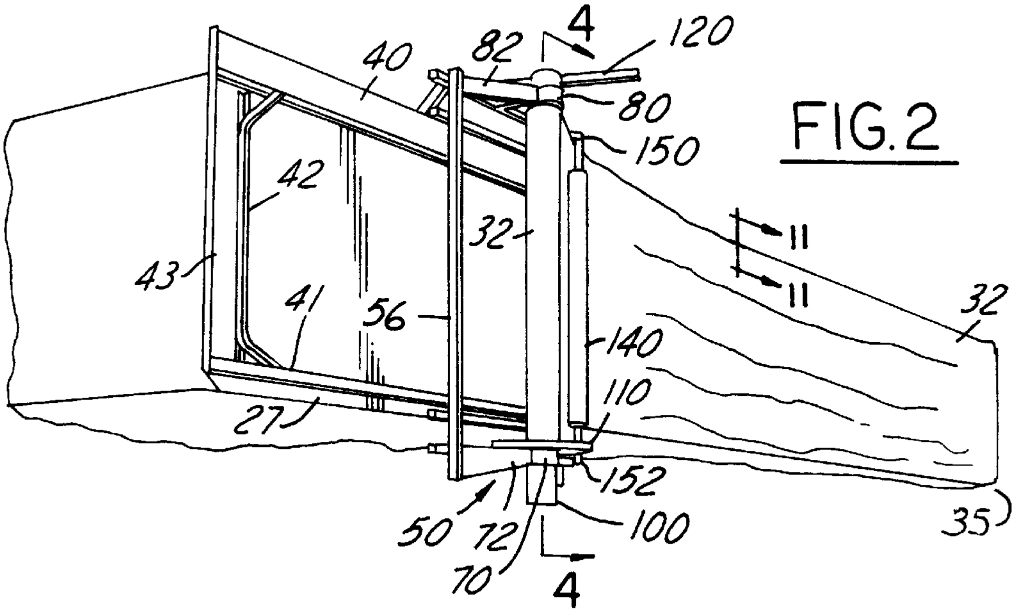
FIG. 2 is a perspective view of a canopy fascia structure of the type shown in FIG. 1 and illustrating the use of the present invention.
Figure 4:
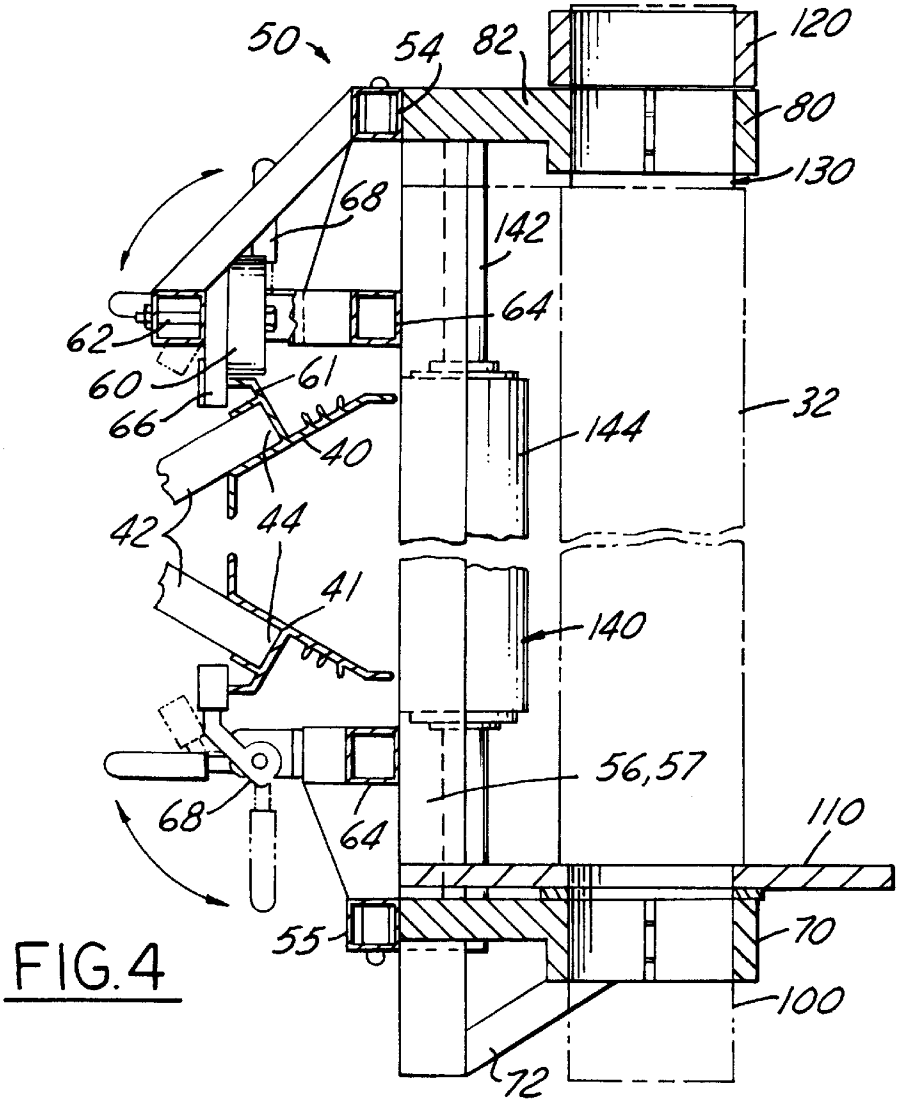
FIG. 4 is a cross-sectional view of the trolley as shown in FIG. 2 and as taken along lines 4—4 in FIG. 2.
Figure 3:
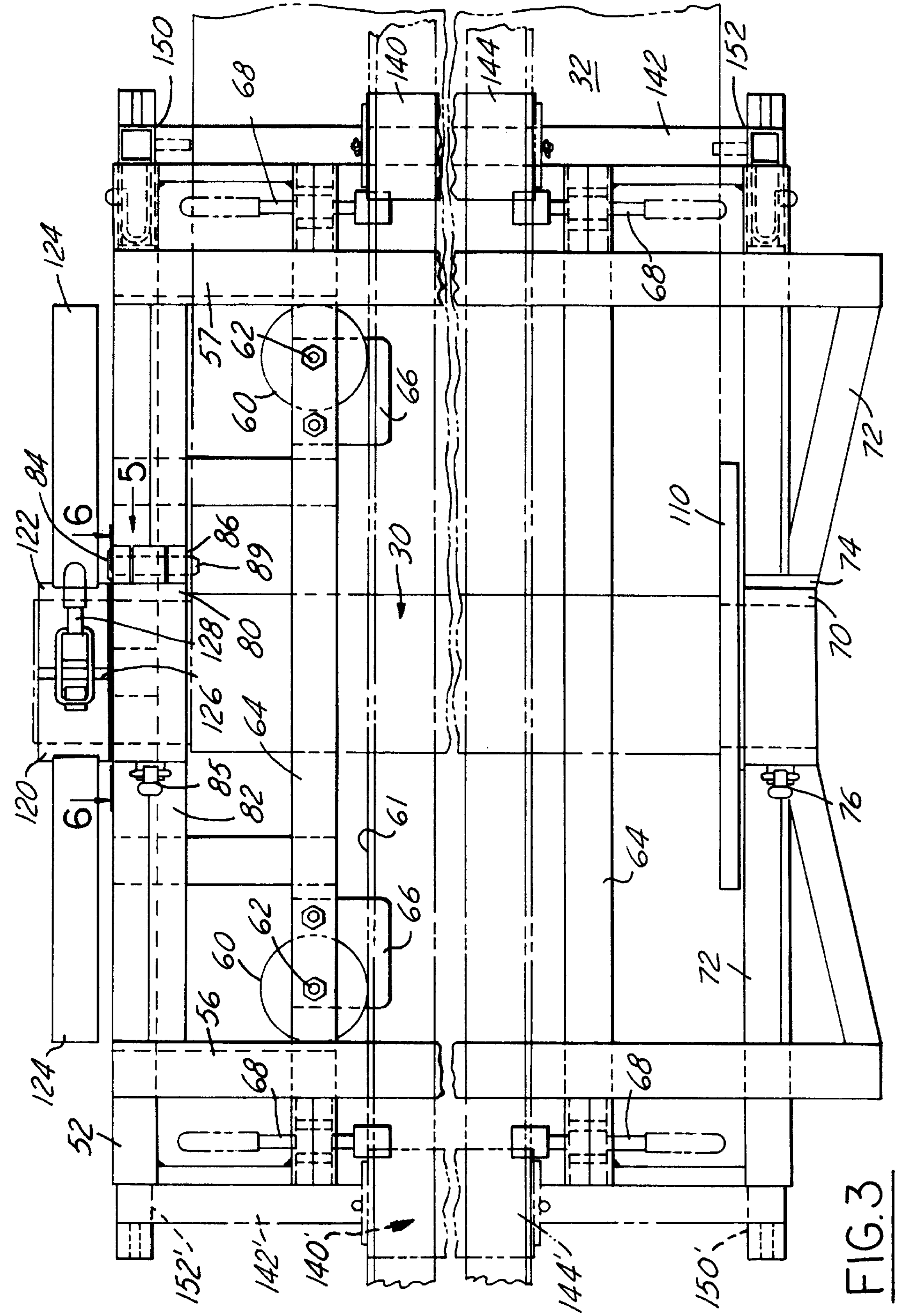
FIG. 3 is a front elevational view of a first embodiment of a trolley and roller member in accordance with the present invention.
Figure 5:
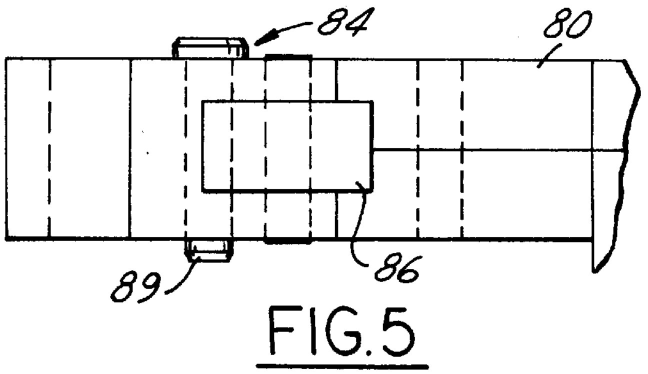
FIGS. 5–8 depict a collar member used with the present invention.
Figure 6:
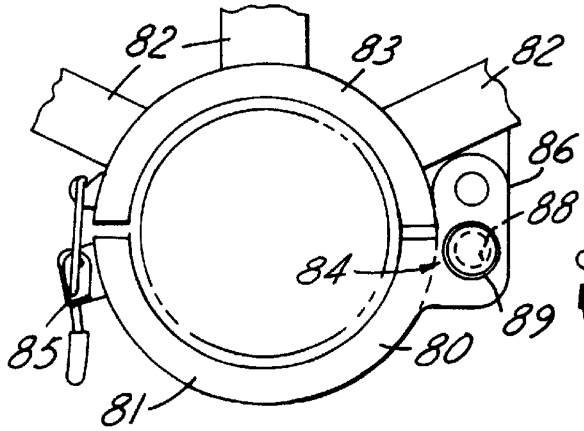
Figure 7:
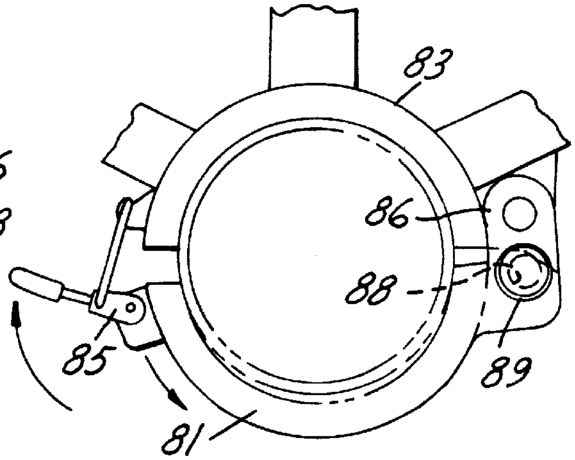
Figure 8:
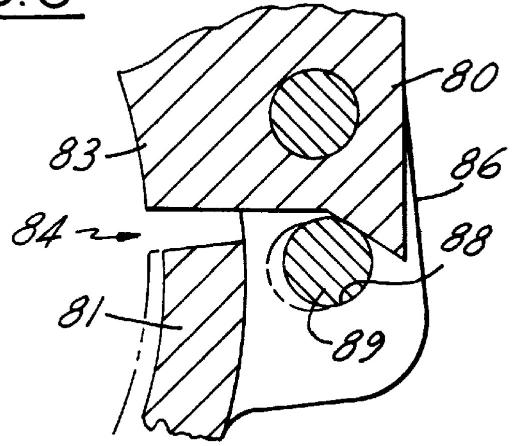
Figure 9:
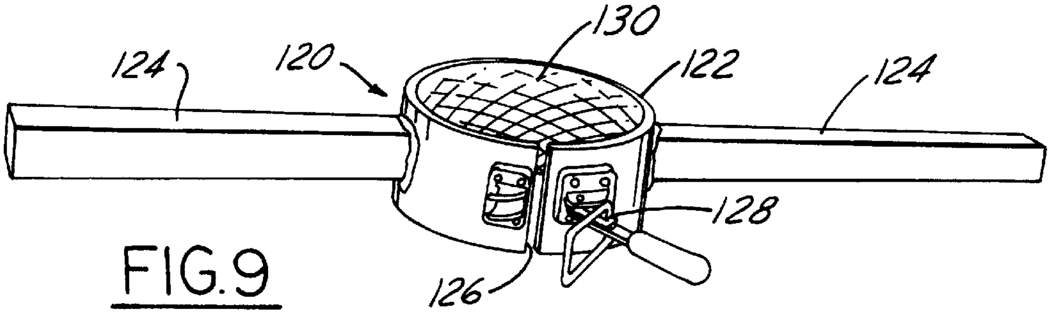
FIG. 9 discloses a handle member which can be utilized with the present invention.
Figure 10:
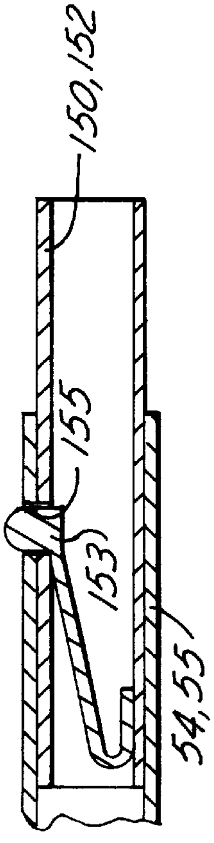
FIG. 10 illustrates a mechanism for securing the roller member to the trolley in accordance with the present invention.
Figure 11:
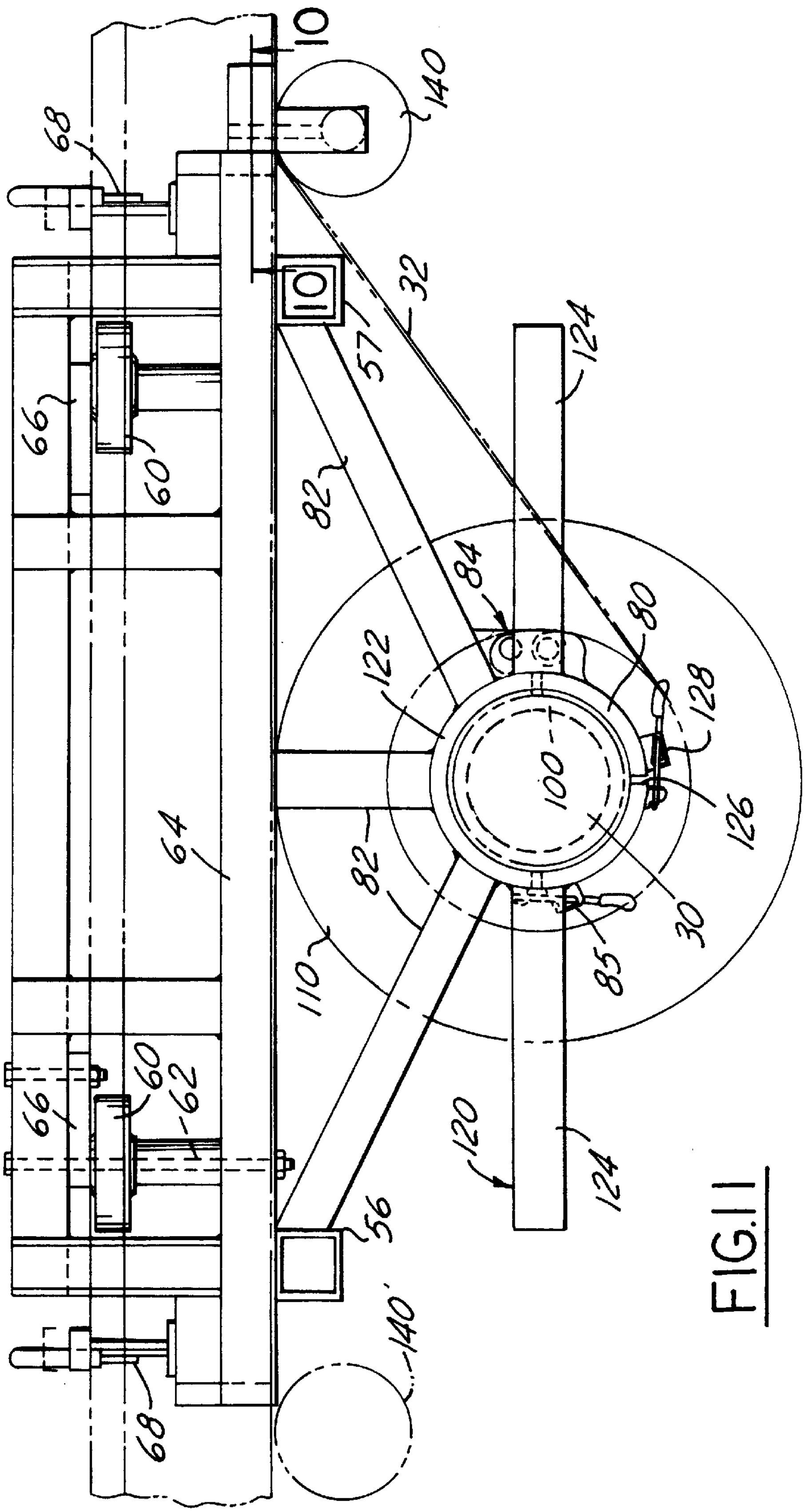
FIG. 11 is a top elevational view of the invention.

As shown in FIG. 1, the service station has an island 20 with a number of gasoline pumps 22 positioned thereon and the entire area is covered with a canopy 24. The canopy covers the area where the vehicles 26 are parked to purchase gasoline, protects the customers from weather elements and also provides a safe, well illuminated area for use at night.

Typically, a number of lights 25 are provided on the underside of the canopy which project illumination downwardly for the customers benefit. Also, the canopy has fascia areas around its perimeter which typically are approximately 1–3 feet in height and can be 10–20 to 100 feet or more in width. These fascia areas are indicated by the numerals 27 and 28 in FIG. 1. These fascia areas can be illuminated, although normally only those fascia areas which are exposed to passing motorists and are visible from a distance are typically illuminated. The illumination allows the name of the service station to be highlighted and also provides reference to some of the services and facilities of the station. Typically, at least two and in most cases three fascia areas of the canopies are illuminated.

The canopies can be illuminated in a number of ways. For example, there are a number of conventional systems in use today which illuminate canopies internally by a plurality of elongated fluorescent lights. An improved illumination system, and the one preferably used with the present invention, utilizes a plurality of single point lights, such as metal halide lights, and a light dispersion member positioned between the lights and the front panel of the fascia structure. The fascia structure has an extruded aluminum frame system around its perimeter and a flexible face sign panel tensioned and held in place on its outer surface. An illumination system of this type is shown in U.S. Pat. No. 5,381,324 entitled "Illuminated Canopy System" and assigned to the same entity as the present invention. The disclosure of that U.S. Pat. No. 5,381,324 is hereby incorporated herein by reference.

In accordance with the disclosure of U.S. Pat. No. 5,381,324, the illuminated fascia structure has upper and lower elongated frame members 40 and 41 which are attached to the housing (see FIGS. 2–4). The frame members 40 and 41 are attached to the ends of U-shaped bracket members 42 which in turn are fixedly secured to the canopy fascia structure 43 by screws, bolts or other conventional fasteners (not shown). A plurality of U-shaped bracket members 42 are positioned at spaced apart locations along the canopy fascia structure 43 (as shown in the '324 patent). The frame members 40 and 41 typically are extruded in the cross-sectional size and shape shown in FIG. 4 and include channels 44 in which the ends of the bracket members 42 are positioned.

The trolley member in accordance with an embodiment of the present invention is generally designated by the numeral 50 in the drawings. The trolley has a generally frame-like structure made from a plurality of square aluminum tubing. Aluminum is provided for its lightness and durability, although other materials with similar qualities and features could be used.

The trolley member 50 has a generally rectangular frame structure 52 consisting of horizontal members 54 and 55 and vertical members 56 and 57. The tubing for the frame structure as well as the other members of the trolley are all preferably welded together, although other conventional fastening means could be used.

A pair of wheels or rollers 60 are provided on the upper end of the frame structure. The wheels 60 are positioned to travel along one of the upper rails or flanges 61 of the frame member 40 on the canopy fascia. Wheels 60 are mounted on axles or spindles 62 and secured by an adjacent frame structure 64 which is welded or otherwise secured to the frame structure 52. Preferably, the wheels are made of rubber or have an outer rubber or similar surface. It is also possible to provide other conventional roller-type members or glide-type members so long as performed suitably in accordance with the purposes and objects of the present invention.

A pair of guide blocks 66 are provided to help retain the trolley 50 on the canopy frame structure. The glide blocks are preferably made from a plastic material, such as a high molecular weight polyurethane. The glide blocks also, since they are made of plastic, provide a gliding surface which is low in friction and allows the trolley to be moved easily along the frame structure.

A plurality of clamping members 68 or clamp locks are attached to the rear of the frame structure 52. These clamping members are preferably "Destaco-type" toggle clamp locks and are used to lock the trolley in position on the frame structure.

A lower collar member 70 is attached to the frame structure by a plurality of support members 72. Collar member 70 is formed in two half or semicircular sections hingedly joined together at one end by hinge member 74. A clamping member 76 is used to hold the two halves of the lower collar member 70 together when the collar is in its closed position.

A second collar member 80 is attached to the upper end of the frame structure 52. Collar member 80 is similar to lower collar member 70 in the sense that it is attached by a plurality of support members 82 to the frame structure and is provided in two halves 81,83 or semicircles hingedly connected together at one end by hinge member 86 and adapted to be securely locked together at the opposite side by a toggle-like clamp member 85. The upper collar member 80, however, has a hinge member with a secondary locking mechanism 84 to prevent undesired opening of the two halves of the collar except for entry and removal of the sheet material roll 30. In the pivot or hinged member 86, an opening 88 is provided for a hitch pin 89 or the like. When the collar halves are in their closed position and the hitch pin 89 is inserted in the opening, the collar 80 can only open a limited extent, such as ⅛–¼ of an inch, when the toggle-clamp 85 is released. On the other hand, when the hitch pin is removed, the two halves of the collar member can be rotated to the completely open position.

The two collar members 70 and 80 are provided to hold a spool or roll 36 of flexible face sign panel 32 in place on the trolley. The flexible face sign panel normally is supplied on a cardboard or other type of conventional spindle 100. When the collar members 70 and 80 are rotated to their open positions, the spindle 100 of the flexible face sign panel roll can be installed and removed in the collars. On the other hand, once the spindle 100 is positioned in the collars 70,80 and the collars are rotated to their closed and locked positions, encircling the ends of the spindle, the spindle and flexible sheet sign panel roll cannot be removed from the trolley. The upper collar 80 also is adapted to selectively lock the spindle and prevent it from rotating.

In order to support the spool of sheet material when it is installed in the trolley, an enlarged circular disk 110 is positioned on the end of the spindle before it is positioned in the lower collar member 70. Preferably, the disk is of a ultra high molecular weight plastic material, although it could be made of any other material with an appropriate washer or the like provided with it.

A handle member 120 is provided to assist in tensioning and stretching the flexible sheet sign panel 32 after it is rolled out a sufficient distance on the frame structure. The handle has a central collar 122 and two or more elongated lever-type handle members 124. The collar 122 has an aperture or opening 126 thereon so that the size of the collar opening can be adjusted slightly as desired. A toggle-type clamping member 128 is provided to close and lock the opening or aperture 126 as desired.

The handle 120 is adapted to be positioned over the upper end of the spindle 100 and, when clamped thereon, used to rotate the spindle. For this purpose, in one embodiment, a series of grooves 130 can be provided on the interior surface of the collar 122 to increase the friction (see FIG. 9).

Although it is preferred that the handle 120 be positioned on the upper end of the spindle 100, it is also understood that the handle could be positioned on the lower end of the spindle and used to stretch and tension the flexible face sign material 32 in the same manner.

Roller member 140 is attached to the trolley member 52. The roller member 140 includes an elongated shaft 142 and a rotatable cylindrically-shaped roller 144 mounted thereon. Preferably the roller 144 is made from a plastic or comparable material. A pair of cotter pins positioned in openings on the shaft 142 hold the roller 144 in position.

The two ends 150 and 152 of the roller member 140 are adapted to be positioned in the open ends of the tubing members comprising the trolley frame structure 52. In this regard, the ends 150 and 152 have a mating tubular member which telescopically fits inside the tubing members 54 and 55 of the frame structure (see FIG. 10). A spring-activated detent button 153 is provided on the ends 150,152 of the roller member and are adapted to mate with openings 155 in the frame tubing 54,55 so that the roller member can be firmly locked in position on the trolley.

The invention is adapted such that the roller member 140 can be positioned on either side of the frame structure 52 of the trolley 50. As shown in phantom lines 140' in FIGS. 3 and 11, the roller member 140 can be removed from one side of the frame structure and positioned on the opposite side. In this regard, the roller member has to be rotated 180°, as shown by the respective position of ends 150' and 152' in FIG. 3, in order to be positioned on the other side.

As shown in the drawings, roller member 140 is positioned such that it rides along the outer edges or surface of the frame structure thus ensuring that the sign panel 32 is positioned against the front face of the frame structure when it is being applied thereto.

In use, after the roll of sign material 32 is positioned in the collars 70 and 80 in the trolley, one end of the material is threaded between the roller member 140 and the frame structure as shown. The end of the sheet material is then secured to one end 35 of the frame structure in any conventional manner.

In use, the trolley is positioned on the frame structure after the frame structure is installed on the canopy fascia. The trolley can be positioned on the frame structure either by hand or with a crane of some type. Prior to positioning the trolley on the frame structure, a roll of flexible face sign material is positioned and locked in the collars 70 and 80. It is also possible in accordance with the present invention to position the roll of sign material in the trolley after the trolley is positioned on the frame structure. The end of the sheet material is then passed under the roller member 140 and secured to the end of the frame structure.

The trolley member is transported a distance along the frame structure as desired by the installers. Typically, this can be anywhere from 6–10 feet. As the trolley is being moved along the frame structure, the spindle is allowed to turn in the collar member 70 and 80 thus allowing the sheet material to be unrolled. Thereafter, the clamping members 68 positioned on the rear of the frame structure are manually activated to firmly hold the trolley in position on the frame structure. Once the trolley is locked in position, the handle is rotated thereby stretching and tensioning the sign material along the face of the frame structure. Once the appropriate tension is reached, the upper collar member 80 is firmly locked in position, preventing the spindle and sheet material from moving in either direction.

At this point, the upper and lower edges of the flexible face sheet material are stretched and clamped in position on the upper and lower edges of the frame structure as known in the art, or as disclosed in U.S. Pat. No. 5,381,324, the disclosure of which is hereby incorporated by reference. Another preferred system is disclosed in U.S. patent application Ser. No. 08/562,073, filed on Nov. 22, 1995 and entitled “Sheet Tensioning System”, the disclosure of which is hereby incorporated by reference.

Once the upper and lower edges of the flexible face sheet material are secured to the frame structure, the clamping members are released from the frame structure, the upper collar 80 is loosened, and the trolley is then moved to still another position along the frame structure. At this point, the process mentioned above is repeated and a second portion of the sheet material is tightly tensioned and secured in position on the frame structure.

This process is repeated along the length of the frame structure until the trolley is positioned at or near the opposite end of the frame structure from where it started. Once the flexible face sign material is stretched and secured as far along the frame structure as possible, the final few feet of the sign material is unrolled from the spindle, and the trolley 50 is removed from the frame. In this regard, the trolley and roller members are removed either by hand or crane as desired. Once the trolley member is removed, the remaining few feet of the sign panel is stretched and affixed to the opposite end. The upper and lower edges of the sign panel are secured as well.

Figure 12:
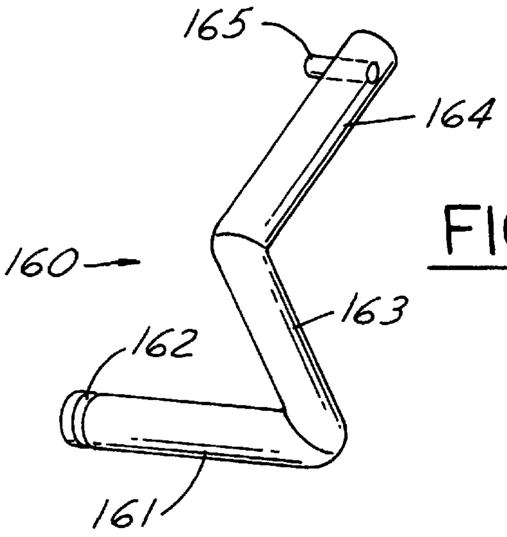
FIGS. 12–14 illustrate an alternate embodiment of the present invention in which the trolley is releasably held in position by stop arm members.
Figure 13:
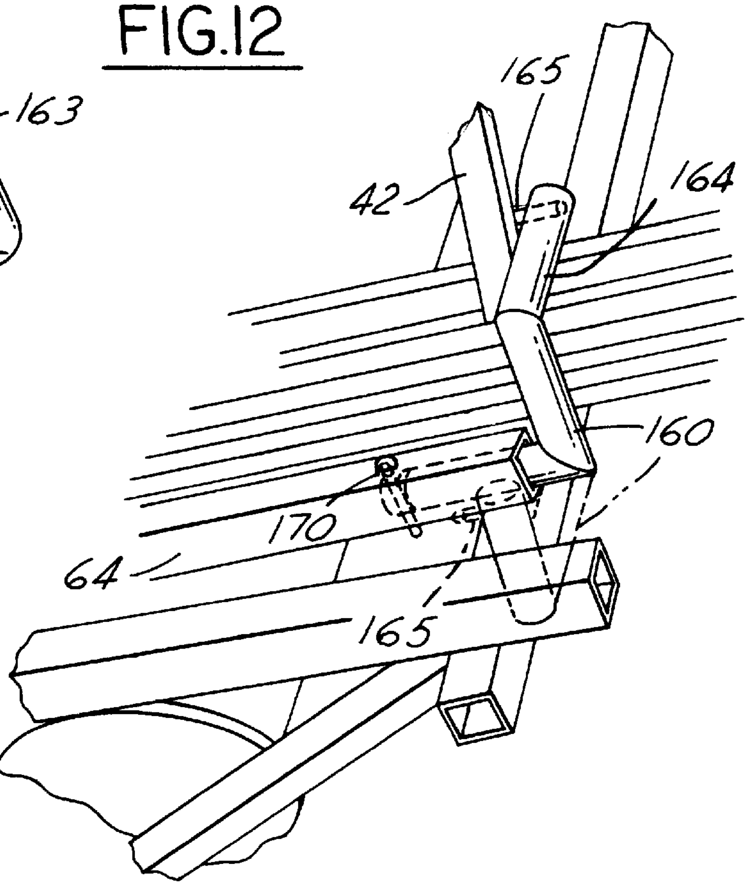
Figure 14:
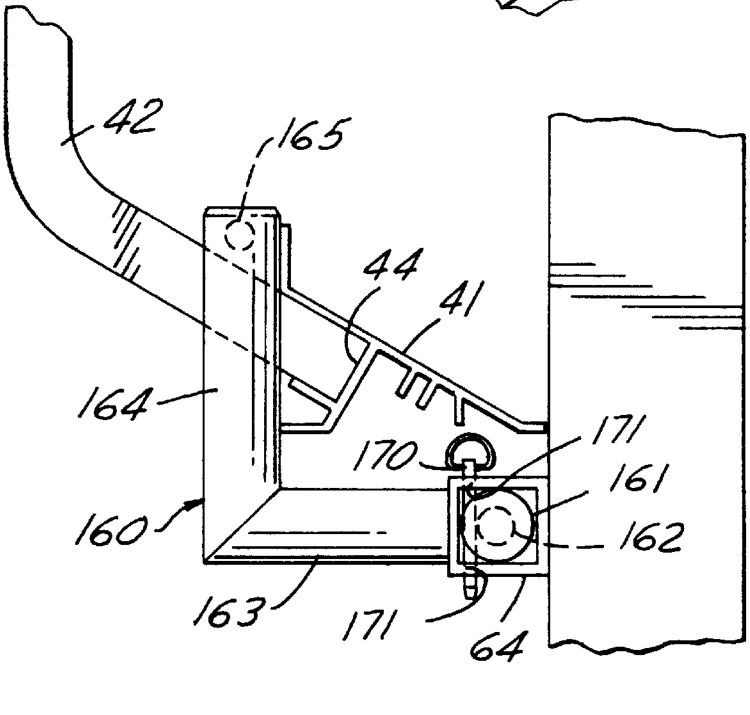

In accordance with an alternate embodiment of the invention, one or more stop arm members are provided in place of the toggle-type clamping members 68 used to releasably lock the trolley in position on the frame structure. A stop arm member 160 is shown in FIG. 12 and perspective and partial cross-sectional views depicting its use are shown in FIGS. 13 and 14.

The arm (or “hook”) members 160 are made from hollow or solid metal members welded or otherwise affixed together in the configuration shown. The members 160 have a first portion 161 with an annular groove 162, a second connecting portion 163, and a third portion 164 with a protruding rod 165.

Since the trolley 50 is designed to move in either direction along the fascia member and position and stretch the sign panel in either direction, it is necessary to provide two stop arm members which are mirror or reverse images of one another. One of the arm members is positioned on one side of the spindle 100 in order to lock and stop movement of the trolley in one direction, and the other arm member is positioned on the other side of the spindle 100 in order to lock and stop movement of the trolley in the other direction.

The arm member 160 is positioned in the open end of tube or frame structure 64 and held in place by a conventional hitch pin 170 or the like. As shown in FIGS. 13 and 14, the hitch pin 170 is positioned through openings 171 in tubular member 64 and fits within annular groove 162 on the portion 161 of the arm member. This arrangement securely connects the arm member 160 to the trolley structure, but still allows the arm member to rotate into and out of its locking and unlocking positions.

In order to positively stop and hold the trolley in position along the length of the fascia structure, the arm member 160 is rotated to its locked position (as shown in FIGS. 13 and 14) such that the third portion 164 is positioned to directly contact the U-shaped bracket member 42 and the rod or pin member 164 is positioned over the bracket member 42. The rod member 165 prevents the stop arm member from being inadvertently dislodged once the arm member 160 is in its locked or “stop” position. In order to place the arm member 160 in position, the trolley should be moved slightly past a U-shaped bracket member (in order to provide clearance for rotation of the rod or pin member 165 into locking position). Once tension is started to be applied to the flexible sign panel, the portion 164 at arm member 160 will immediately come into contact with the U-shaped bracket member 42 and lock the trolley in position for further stretching and tensioning procedures.

When it is desired to move the trolley along the fascia, tension is relaxed and the arm member is rotated to its unlocked or storage position 160' (as shown in phantom lines in FIG. 13). Once the trolley is moved to the next position for stretching the sign panel, the locking process is repeated.

Also, it is possible to provide either one or two stop arm members on either side of the roll of sign panel material in order to lock the trolley in position. They can be positioned in the upper and lower tubular frame structures 64 of the trolley.

Figure 15:
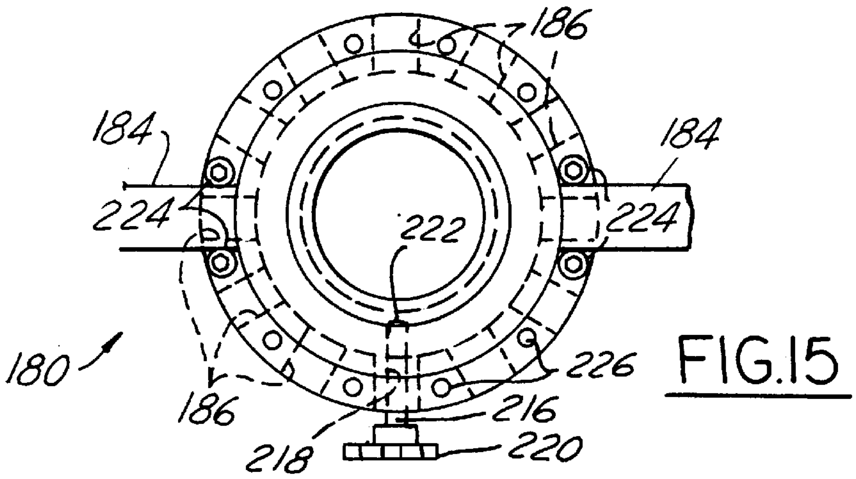
FIGS. 15–17 illustrate an alternate embodiment for locking the sign panel spindle and tensioning the sign panel on the fascia structure.
Figure 16:
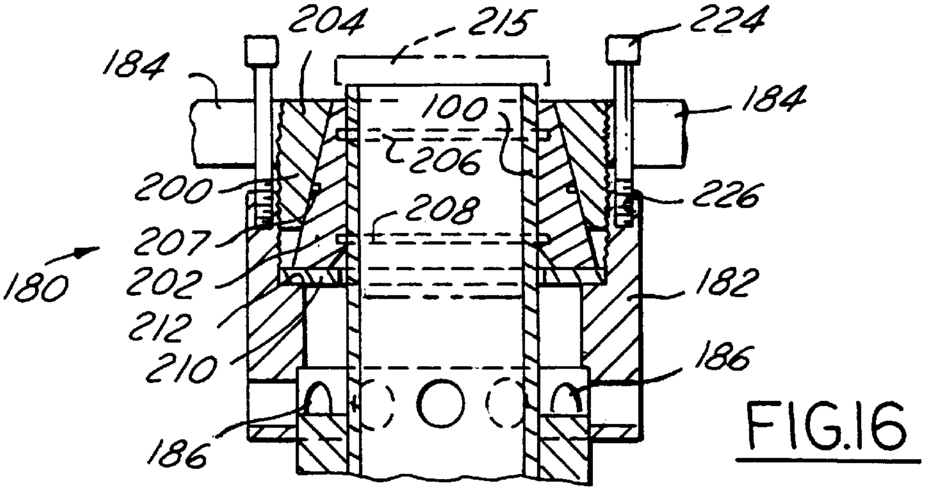
Figure 17:
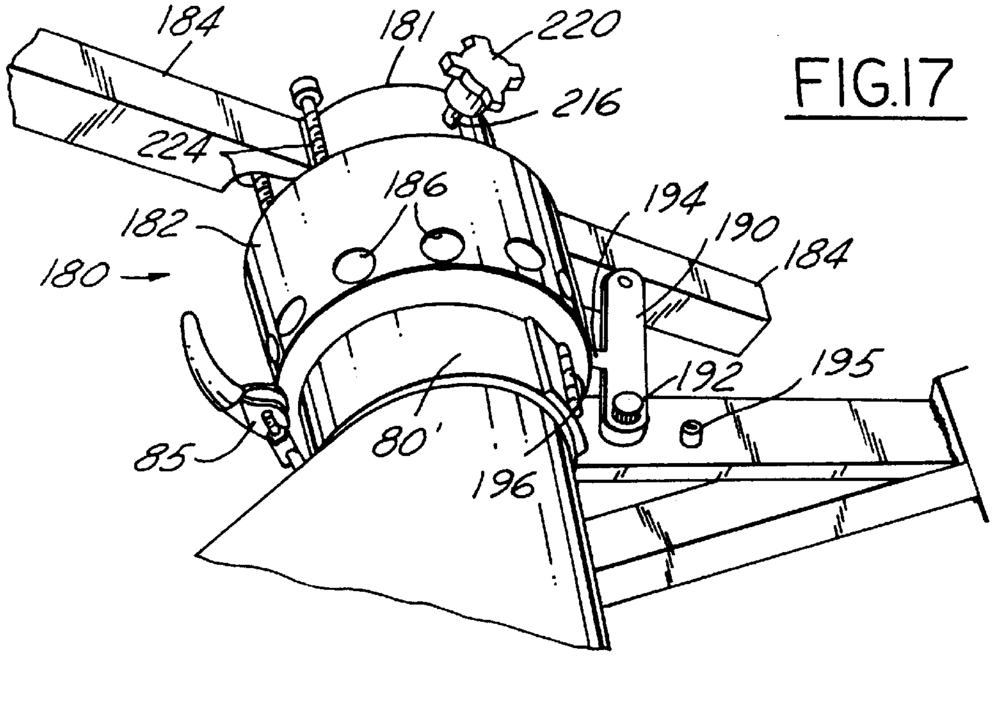

An alternate and improved handle member and mechanism for locking the handle member and tensioning the sign panel is shown in FIGS. 15–17. In this embodiment, the handle member is noted by the reference numeral 180.

The handle member 180 has a central hub 181 and a plurality of elongated lever-type arm members 184 for use in manually rotating it. Two, three or more arm members 184 can be provided as desired, although it is currently preferred that two arm members be utilized. The handle member 180 is preferably made from a metal material, such as aluminum.

A series of holes or apertures 186 are provided around the circumference of hub 182. A locking pin member 190 is rotatably secured to the frame structure 82 of the trolley 50 by pivot member 192. The locking pin member 190 has a protruding pin or rod 194 which is adapted to fit in one of the holes 186 and thus selectively lock the handle member 180 from rotation when desired. A stop member 195 is provided on the trolley to prevent the locking pin member from rotating too far out of locking position and so it can be found easily for manual insertion in one of the holes 186.

The handle member 180 sits on upper collar member 80' which is similar to collar member 80 discussed above, but has a simple hinge mechanism 196 (similar to hinge mechanism 74 on lower collar member 70), rather than secondary locking mechanism 84.

An expander mechanism 200 is positioned inside the hub of the handle member 180 and is used to securely attach the handle member to the end of the spindle 100. The expander mechanism 200 is similar to a vehicle tailpipe exhaust expander mechanism currently available and has two annular series of wedge-shaped finger members 202 and 204. The inner finger members 202 are held together by circular wire ring retainers 206, 207 and 208. A washer 210 is positioned on shoulder 212 in hub 182 and holds the finger members 202 and 204 in position as shown.

When the end of the spindle 100 is positioned in the handle member (or the handle member is placed on the end of the spindle), the wedge-shaped finger members slide axially until they are firmly locked in position around the outer surface or circumference of the spindle. This locks the handle member 180 onto the spindle.

Bolts 224 or similar posts are provided to be positioned in holes 226 on the top surface of hub member 182. Once the hub has been rotated, the bolts 224 are inserted in holes 226 to lock hub 181 to hub 182 and prevent arm members 184 from turning relative to hub 182.

If desired, a tapered plug member 215 can be positioned in the open end of the spindle and tapped into place to provide a more secure or solid structure for the expander mechanism. Also, a threaded bolt or rod 216 can be positioned through threaded hole 218 in the hub member 182 and attached to a knob handle 220. Manual rotation of the knob handle and threaded rod allows the end 222 of the rod to bear directly against the spindle 100 and further assist in holding the spindle against rotation relative to the handle member 180.

As an alternative to bolt/rod 216, it is also possible to simply utilize a screw, bolt or other fastener (not shown) which is inserted through an opening (such as hole 218) in the hub member and forced or rotated through one wall of the cardboard spindle 100. This fastener would prevent the spindle from rotating relative to the handle member.

Figure 18:
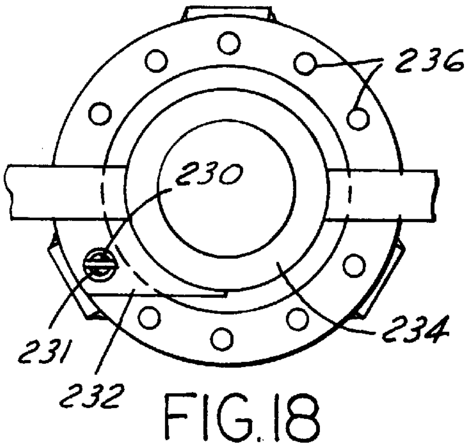
FIGS. 18–19 illustrate another embodiment for selectively locking the handle member and sign panel spindle from rotating.
Figure 19:
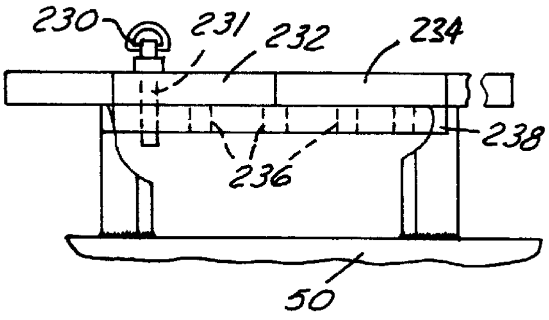

Other alternative embodiments for locking the handle member from rotation are shown in FIGS. 18–23. In FIGS. 18–19, a pin or bolt 230 is positioned through a hole 231 in flange 232 on the handle member 234. The pin 230 mates with one of a series of holes 236 in annular plate 238 affixed to the frame structure of the trolley 50.

Figure 20:
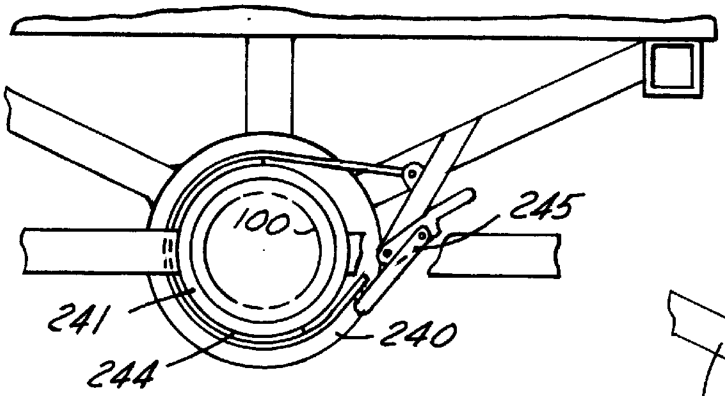
FIGS. 20–21 illustrate still another embodiment for selectively locking the handle member and sign panel spindle from rotating.
Figure 21:
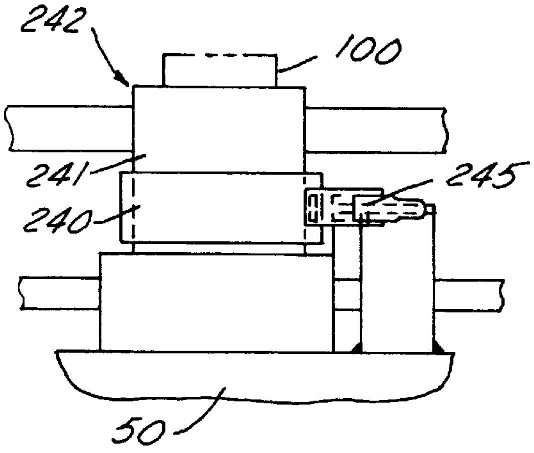

In FIGS. 20–21 a flexible metal band 240 is positioned around the outer circumference of the hub 241 of the handle member 242. A brake lining member 244 (or member of a similar material) is secured to the inside of the band 240. Toggle clamp 245 is used to tighten the band 240 on the handle and prevent it from rotating.

Figure 22:
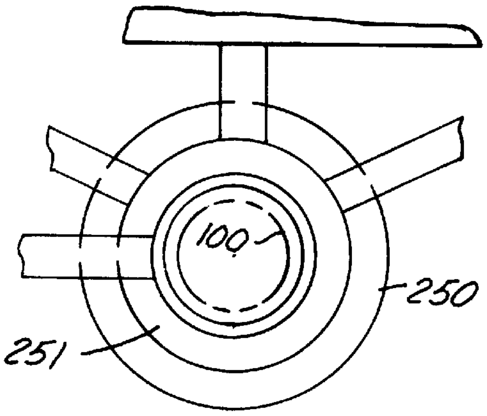
FIGS. 22–23 illustrate a further embodiment for selectively locking the handle member and sign panel spindle from rotating.
Figure 23:
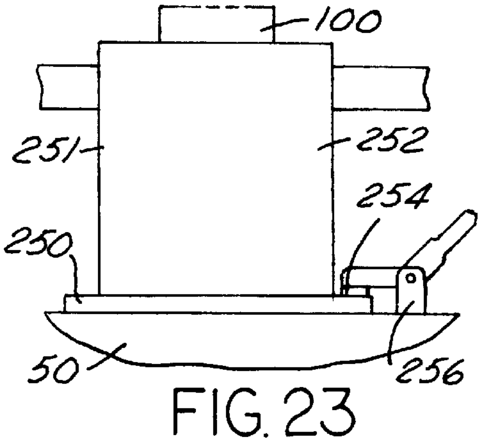

In FIGS. 22–23, a metal flange 250 is affixed to the hub member 251 of the handle member 252. A brake pad member 254 is attached to the end of a clamp or caliper-type housing 256 which is mounted on the trolley frame structure 50. Selective tightening or clamping of the pad 254 on the flange will prevent the handle member from rotating.

Figure 24:
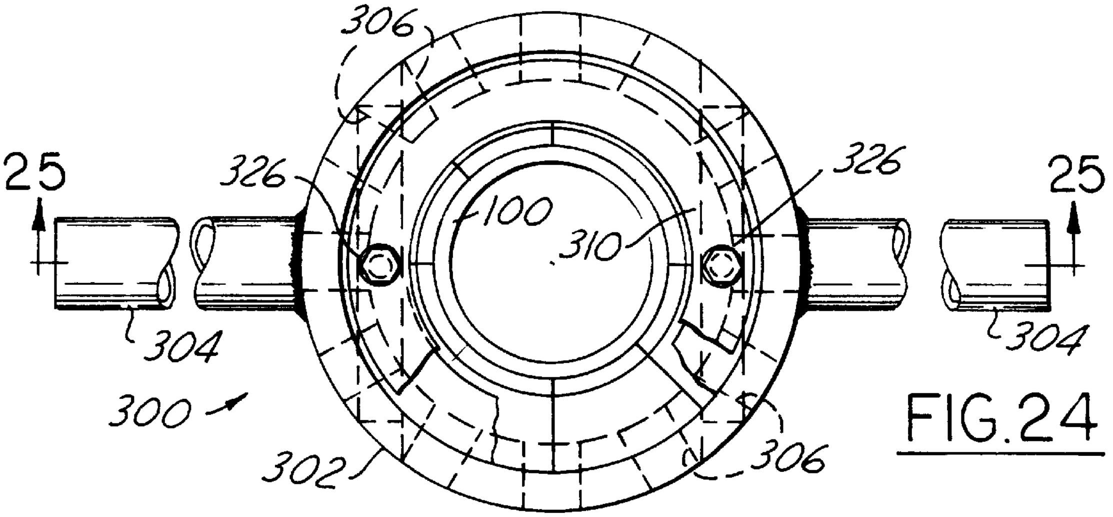
FIGS. 24–26 illustrate still another embodiment of the invention, with FIG. 24 being a top elevational view thereof, FIG. 25 being a cross-sectional view of the member of FIG. 24 taken along lines 25—25 in FIG. 24, and FIG. 26 being a cross sectional view of the member taken along lines 26—26 in FIG. 25.
Figure 25:
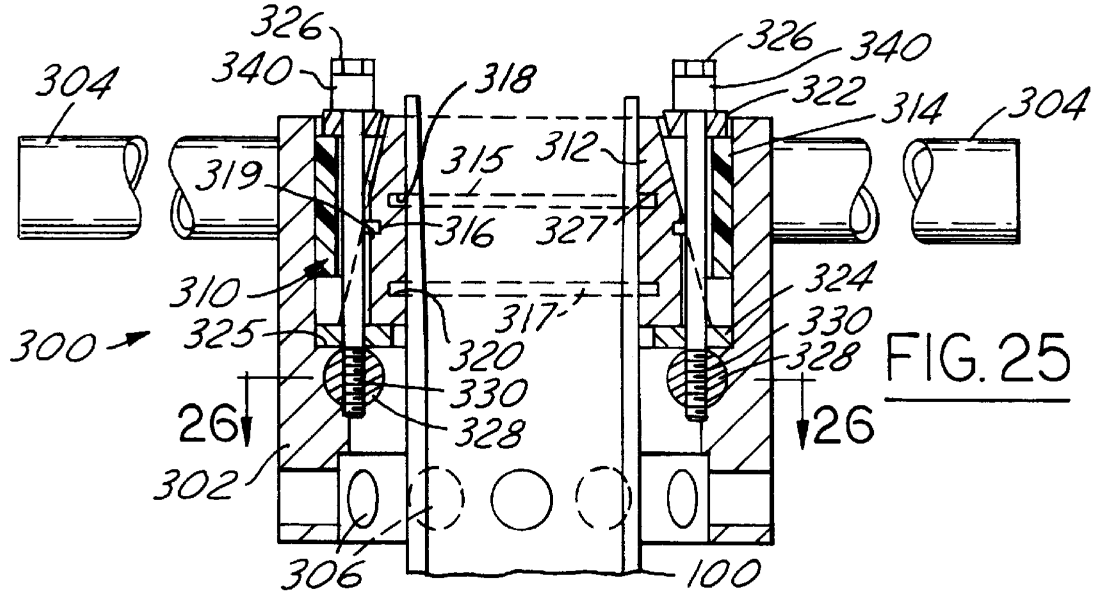
Figure 26:
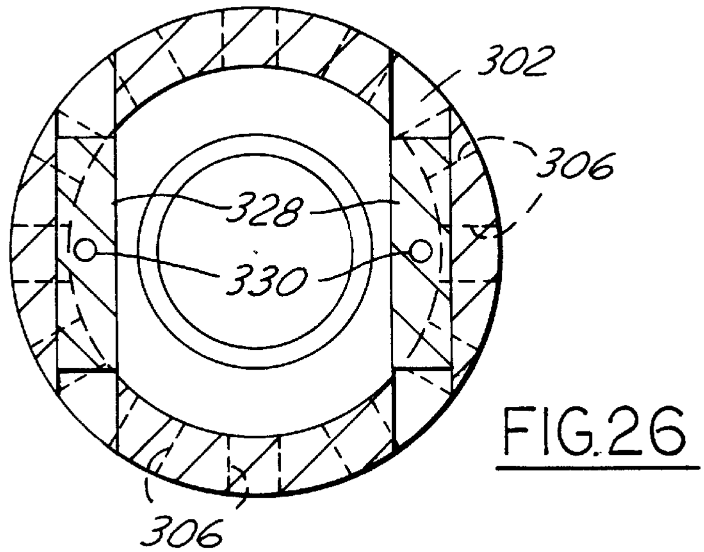

A preferred embodiment of handle member and selective locking mechanism is shown in FIGS. 24–26. The handle member and locking mechanism is noted by the reference numeral 300. Similar to the other embodiments discussed above, the member 300 has a central hub 302 and two elongated arm members 304.

A plurality of holes 306 are provided around the circumference of the hub 302 for mating with locking pin member 190 (shown in FIG. 17) when the member 300 is positioned on the trolley. The hub 302 is an elongated hollow metal cylinder (preferably made of aluminum for weight considerations).

The spindle 100 is held securely against rotation in the hub 302 by wedging gripper mechanism 310. Mechanism 310 has an annular ring of wedge-shaped finger members 312 positioned inside a hollow tapered cylinder member 314. Preferably eight metal finger members 312 are provided and they are held together by circular retainer members 315, 316, 317 positioned in annular grooves 318, 319 and 320, respectively. The retainer members can be wire, plastic rods, or the like. The tapered cylinder member 314 is preferably made of a hard plastic material, such as nylon or polycarbonate and has a circular tapered internal surface 327.

Upper and lower circular annular ring members 322 and 324 hold the finger members 312 and cylinder member 314 together and in position. Ring member 324 is positioned on annular shoulder 325 in hub 302. A pair of long threaded fasteners, such as bolts 326, threadedly anchored in transverse rods 328 are used to tighten the wedging gripper mechanism 310 and secure the member 300 to the end of the spindle 100. When the bolts 326 are tightened into the threaded openings 330 in rods 328, ring member 322 is forced towards ring member 324 tightening the wedging gripper mechanism 310. When the wedge-shaped finger members 312 are forced to slide along the inner tapered surface 327 of cylinder member 314, the inside diameter of the annular series or ring of finger members becomes smaller thereby wedging against the outside of the spindle 100 and securing the spindle in the handle member.

Cylindrical bushings or risers 340 are utilized to allow a greater variation in the ability of the handle member to accommodate spindles of different sizes. If desired, an expander plug (not shown) can be positioned inside the open end of spindle 100 to provide additional support for the end of the spindle.

It is understood that other types of locking mechanisms or systems could be used to secure the handle member to the spindle and to selectively prevent the handle from rotating. In this regard, a conventional ratchet and pawl mechanism could be utilized. If the locking mechanism is electrified, then it is also possible to provide a system utilizing a spur gear and driver mechanism.

A further embodiment of the invention is shown in FIGS. 27–33. The trolley member 400 has a frame structure similar to the embodiments described above, including horizontal frame members 402, 404, 406, 408 and 410, vertical frame members 412 and 414, collar members 416 and 418 (to hold a spool or roll of sign panel material—not shown) and handle member 420. The framework is also used to hold a roller member which is not shown in FIGS. 27–33, but which is the same as roller member 140 disclosed and described above.

A pair of rollers or wheels 422, 424 ride on the upper rails or flanges 426 on upper fascia frame structure member 428. The fascia frame structure 430 also includes a rear panel member 432, a plurality of upper and lower bracket members 434 and 434', respectively, and a lower fascia frame structure member 428' which is the same as member 428. The frame structure member 428 has a rounded front flange 436, a first rib member 438 and a second rib member 440. The lower frame structure member 428' has similar flanges and members 436', 428' and 440', respectively. The frame structure of the trolley member 400 is constructed such that the rollers or wheels 422 and 424 are positioned on flange 426 between flange 436 and rib 438 when the trolley member 400 is positioned on the fascia frame structure 430 (see FIGS. 28 and 29).

Figure 31:
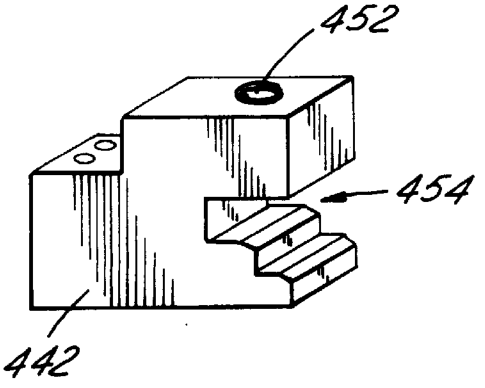
Figure 29:
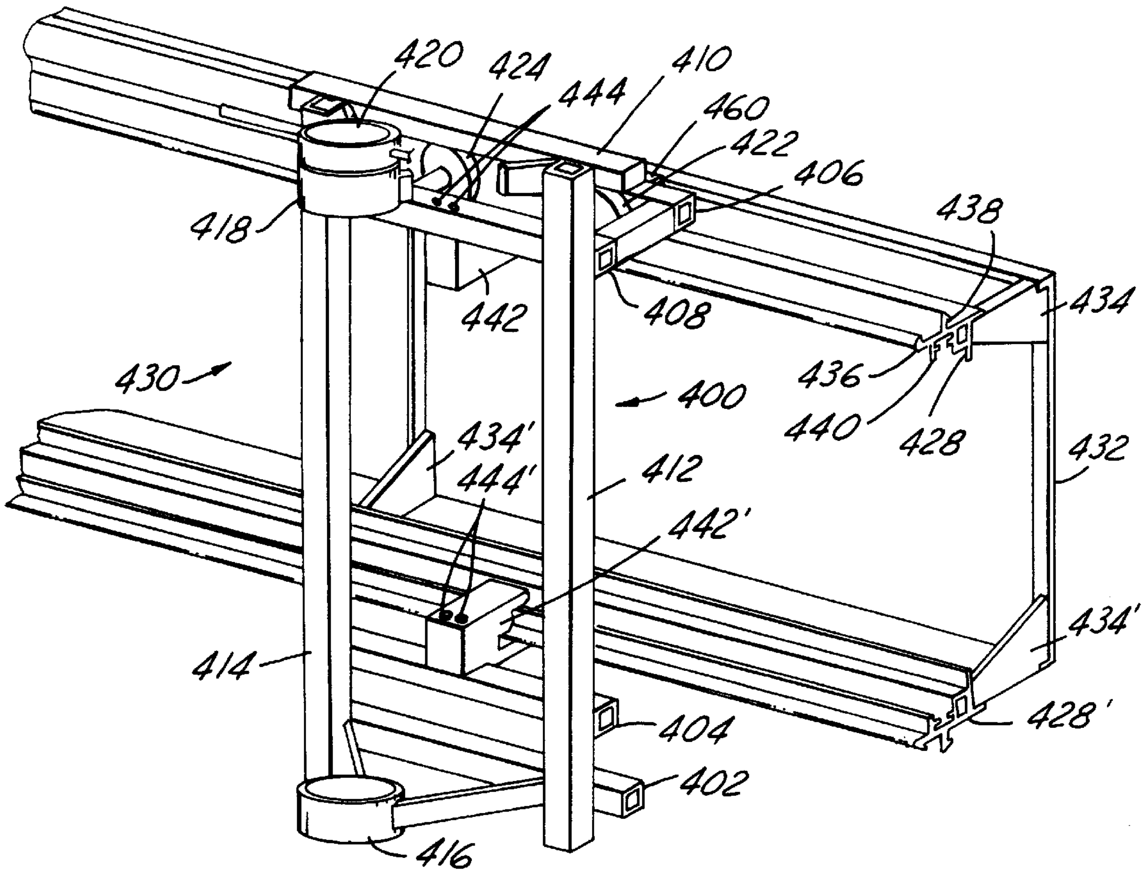

A pair of screw lock block members 442 and 442' are secured to frame members 408 and 404, respectively, on the trolley member. The block members are attached to the frame members by a pair of bolts 444. Turn screw locking members 446 and 446' are used to secure the trolley member 400 to the upper and lower frame structure members 428 and 428'. The screw locking members 446 and 446' have handles 448 and 448' and elongated threaded rods 450 and 450'. The rods 450 and 450' are positioned in threaded metal bushings 452 provided in block members 442, as shown in FIG. 31. Also, channel members 454 and 454' are provided in the locking members and are formed to fit over the edges of the frame structure members.

When the locking members 446 and 446' are tightened against fascia frame structure members 428 and 428', respectively, the trolley member 400 is held securely in place. In this manner, the panel member can be stretched and secured in position on the fascia frame structure in the same manner as discussed above with respect to the other embodiments.

Figure 32:
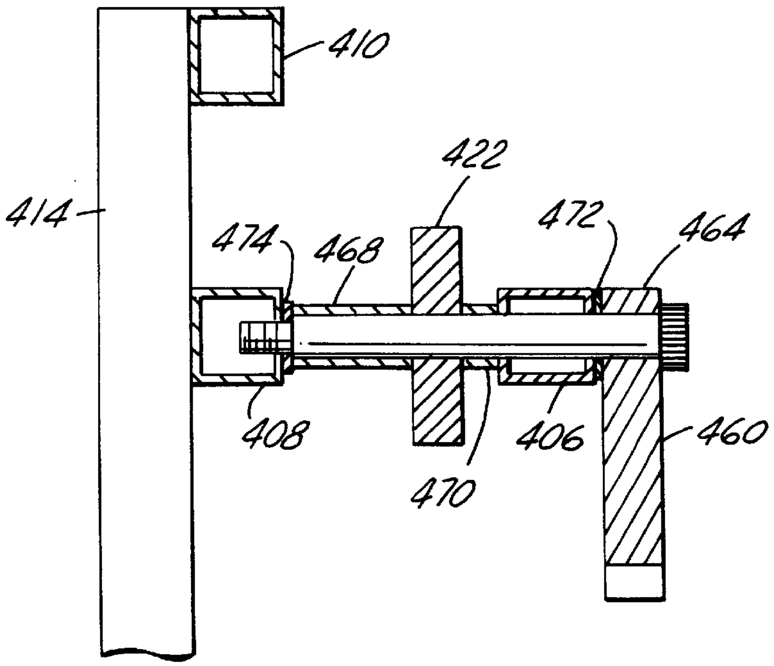
Figure 33:
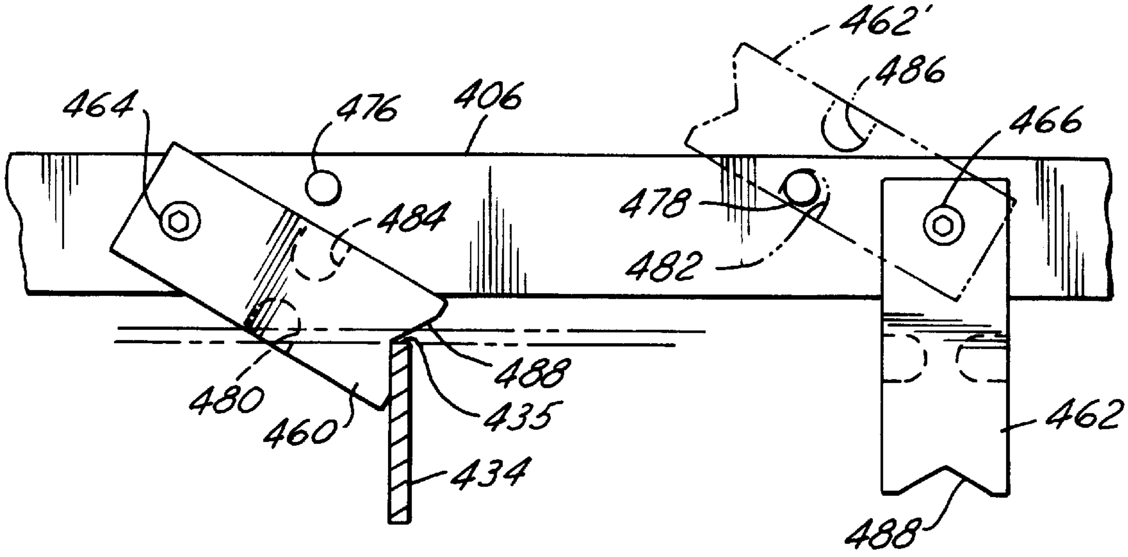

A pair of stop block members 460 and 462 are attached to the frame members 406 and 408 by elongated bolts 464 and 466. As shown in FIG. 32, the bolts secure the block members 460 (462) and rollers 422 (424) to the trolley member. Tubular spacers 468 and 470, together with washers 472 and 474, allow the bolts to appropriately position and secure the members 460 and 462, and still allow the members 460 and 462 to freely rotate around the bolts. A hole 471 is provided in each of the stop block members for positioning of bolts 464 therethrough.

The stop block members primarily are provided to retain the trolley member 400 on the fascia frame structure 430 and not allow the trolley member to become unintentionally dislodged. In order to allow the trolley members 400 to be positioned on the fascia structure 430 in the position shown in the drawings (and also to be removed therefrom), the block members 460 and 462 can be rotated from their normal positions hanging vertically downward (as shown in FIGS. 27, 28, 29 and 32) to positions substantially horizontal (represented by block member 462' in FIG. 33). For this purpose, pegs or screws 476 and 478 are provided on frame member 406 and mate with recesses 480 and 482 in the stop block members 460 and 462 when the block members are rotated to their horizontal positions. The pegs stop the block members from further rotation and at the same time hold the blocks in their horizontal positions.

Figure 27:
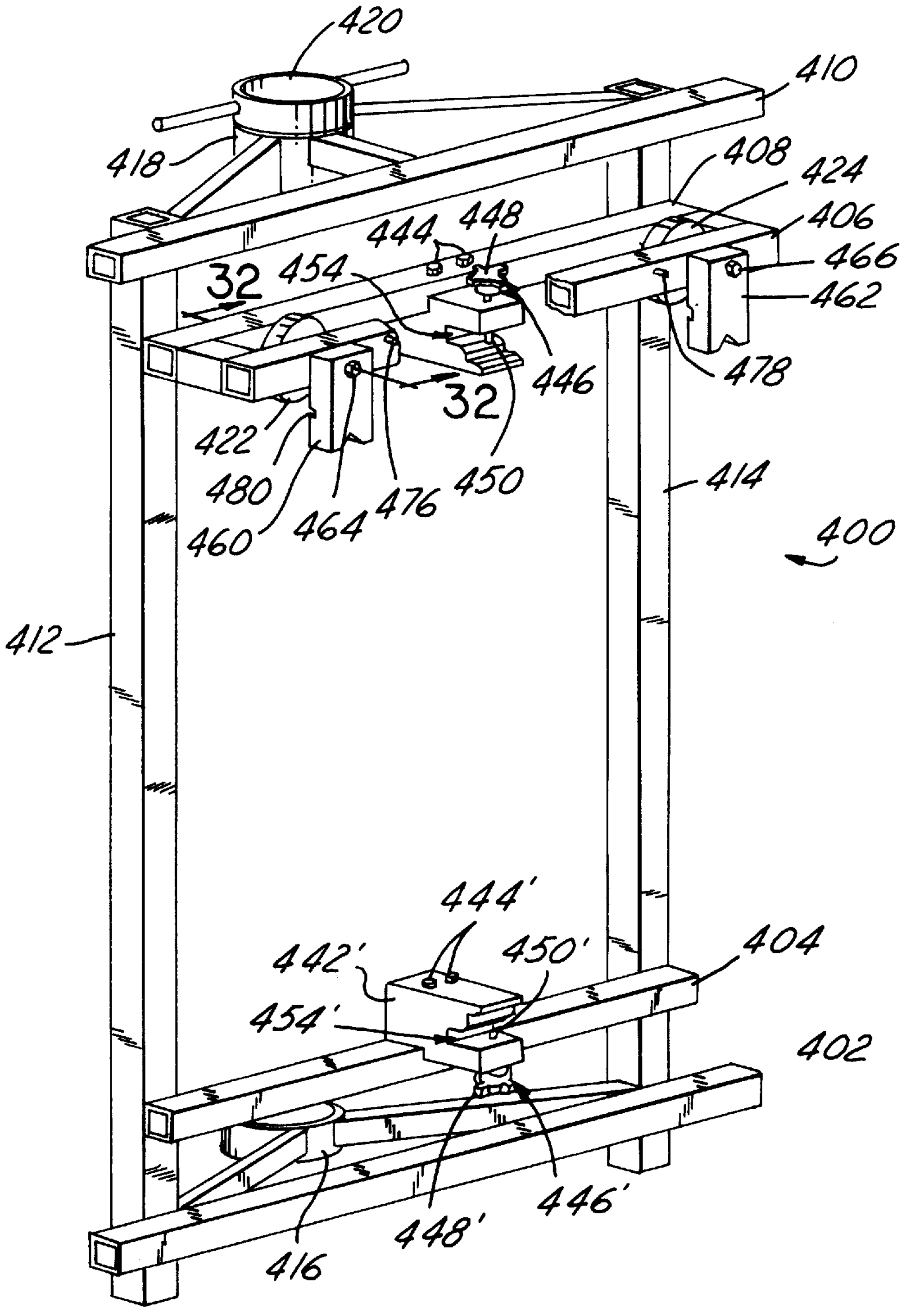
FIGS. 27–33 illustrate a further embodiment of the invention, with FIG. 27 being a perspective view thereof, FIG. 28 being a side elevational view thereof, FIG. 29 illustrating the positioning of the trolley member on a frame structure, FIG. 30 depicting a stop block member, FIG. 31 depicting a screw lock block member, FIG. 32 being a cross-sectional view taken along lines 32—32 in FIG. 27 and in the direction of the arrows, and FIG. 33 illustrating one use of the stop block members.
Figure 28:
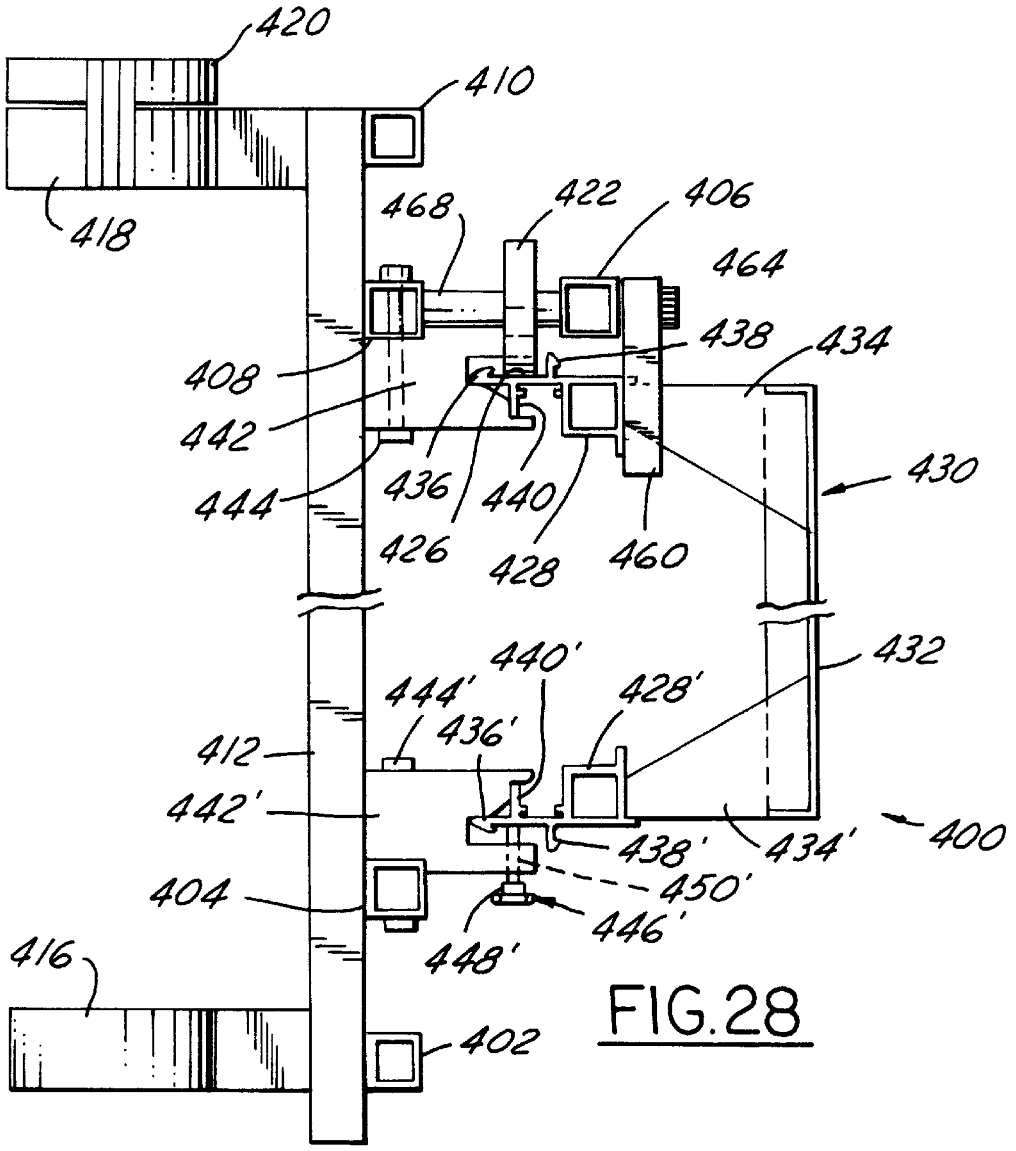
Figure 30:
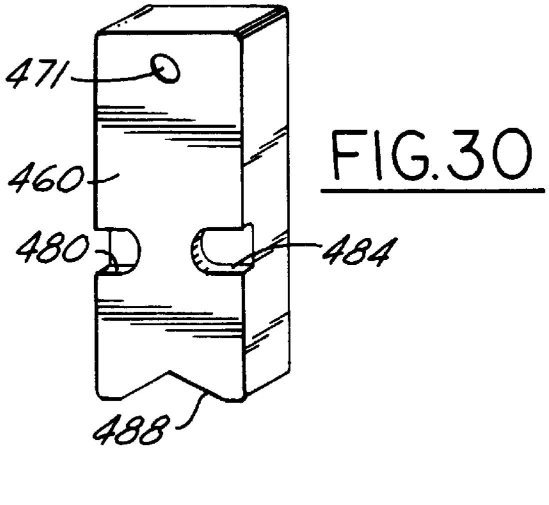

Corresponding recesses 484 and 486 are also provided in block members 460 and 462 in order to allow the block members to pass over bracket members 434 when the trolley member 400 is rolled or slid along the frame structure members. Once the block members clear the bracket members, they automatically resume their vertical downward position (as shown in FIGS. 27 and 28).

The stop block members 460 and 462 can also be used to provide a positive stop for the trolley member relative to the fascia structure 430. This is shown by the position of block member 460 in FIG. 33. V-shaped recesses 488 are provided on the ends of block members 460 and 462 for this purpose. If it is desired to use the positive stop feature (either in place of or together with, locking screws 446, 446'), the V-shaped recess 488 on the block member is positioned against the edge 435 of bracket member 434. In this regard, either block member 460 or 462 can be used for this purpose, depending on the direction of travel of the trolley member on the frame structure and the direction in which the panel member is being stretched along the frame structure.

All of the members of the trolley frame structure are preferably made of aluminum material, preferably tubular aluminum material. The screw lock members 442 and 442' and stop block members 460 and 462 are preferably made of a hard plastic material, such as UHMW polyethylene. It is understood, of course, that other equivalent and comparable materials could be used for the components, so long as the functions and purposes are substantially maintained.

As is clear from the above descriptions of various apparatus and methods for installing the flexible face sign panel, the present invention provides improved mechanisms and systems for installing and stretching a flexible face sign panel on a frame structure.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method for installing a flexible sign panel on a vertical face of a frame structure, the frame structure comprising a first elongated frame member and a second elongated frame member, said first and second frame members being disposed horizontally and parallel to one another, said method comprising the steps of:

a) positioning a roll of sign panel material in a trolley member, said roll of sign panel material having a first end and upper and lower horizontal edges, and said trolley member having a pair of roller members and a first block member for guiding said trolley member on said first frame member and a second block member for guiding said trolley member on said second frame member;

b) positioning said trolley member on said frame structure at a start position such that said pair of roller members engages said first frame member, with said pair of roller members and said first elongated frame member being positioned vertically above said second frame member, said first block member being positioned on said first frame member and said second block member being positioned on said second frame member, at least said first block member having a means for selectively securing said first block member to said frame structure;

c) securing said first end of said sign panel material to said frame structure at said start position;

d) rolling said roller members along said first elongated frame member thereby unwinding the sign material from said roll, and positioning said trolley member at a first position along said frame structure;

e) securing said trolley to said frame structure at said first position by activating said means for selectively securing said first block member;

f) stretching said sign material along said frame structure from said start position to said first position while said trolley is secured at said first position; and g) securing said stretched material to said frame structure while said trolley remains secured at said first position.

2. The method as set forth in claim 1 further comprising the steps of:

h) releasing said trolley member from said first position along said frame structure by deactivating said means for selectively securing said block member;

i) rolling said roller members along said first elongated frame member and positioning said trolley member at a second position on said frame structure; and j) securing said trolley member to said frame structure at said second position by activating said means for selectively securing said block member;

k) stretching said sign material along said frame structure from said first position to said second position while said trolley member is secured at said second position; and l) securing this stretched material to said frame structure while said trolley member remains secured at said second position.

3. The method as set forth in claim 1 wherein said second block member has a means for selectively securing said second block member to said frame structure, and wherein step e) further comprises activating said means for selectively securing said second block member.

4. The method as set forth in claim 1 wherein said step c) comprises securing the upper and lower horizontal edges of said sign panel material to said first and second frame members, respectively.

5. The method as set forth in claim 1 wherein step f) further comprises preventing rotation of said roll of sign panel material relative to said trolley member when said trolley member is secured to said frame structure and said material is being stretched along said frame structure.

6. The method as set forth in claim 5 wherein said preventing step includes activating a locking mechanism that is on said trolley member.

7. The method as set forth in claim 1 wherein said trolley member further comprises at least one stop block member rotatably secured to said trolley member, and step e) further comprises wedging said at least one stop block member against said frame structure, thereby preventing movement of said trolley member relative to said frame structure.

* * * * *